UNITED STATES PATENT OFFICE.

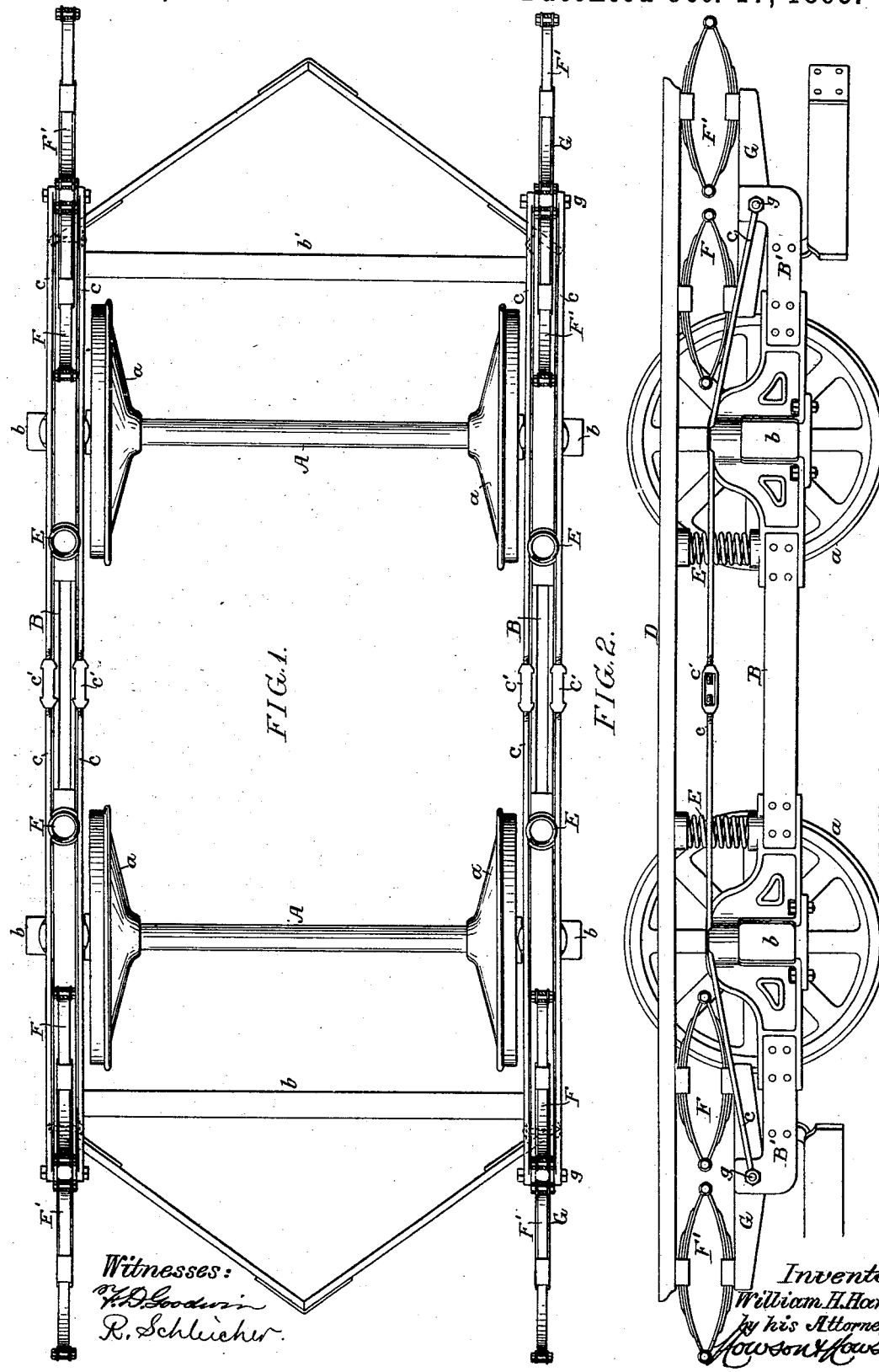

WILLIAM H. HANSELL, OF PHILADELPHIA, PENNSYLVANIA.

CAR-TRUCK.

SPECIFICATION forming part of Letters Patent No. 507,001, dated October 17, 1893.

Application filed June 24, 1893. Serial No. 478,688. (No model.)

*To all whom it may concern:*

Be it known that I, WILLIAM H. HANSELL, a citizen of the United States, residing in Philadelphia, Pennsylvania, have invented certain Improvements in Car-Trucks, of which the following is a specification.

The object of my invention is to support a car body upon a truck in such a manner that the rocking motion is, to a great extent, avoided.

My invention is especially applicable to motor driven cars, such as cable cars or cars driven by electric motors.

In the accompanying drawings:—Figure 1, is a plan view of my improved truck; and Fig. 2, is a side view.

A A are the axles upon which are mounted the wheels $a$. These axles are mounted in suitable boxes $b$ of the ordinary construction, and the boxes being mounted in the frame B B, the frames forming each side of the truck. These frames are connected together by cross pieces $b'$ to the wheels and axles and body of the car.

D is the stringer bar extending the full length of the truck and to this bar is directly attached the body of the car; this bar is mounted upon the center springs E E and the outer springs F F'. The springs E extend from the truck frame B to the bar, being mounted in suitable pockets, while the springs F, F' rest upon a two armed lever G pivoted at $g$ to an extension B' of the truck frame B; this extension B' is preferably stayed by a tie rod $c$ extending from one extension B' to the other and provided with a suitable turnbuckle $c'$. The arms of the lever G are preferably of the same length and the springs F, F' are fastened to the arms in any suitable manner.

The springs E E are situated between the two axles, while the springs F, F' are mounted beyond the axle at each end of the car. The springs E are simply coiled springs while the springs F F' I preferably make in the form of leaf springs of the ordinary construction.

When the car is in motion and the car body starts to oscillate upon the truck the springs at one end take up the motion, the pressure upon the outer spring being transferred to the inner spring through the equalizing lever G. Thus I can utilize the full effect of both springs which are light and easy riding, whereas if a single spring was used on a rigid base the motion would be taken by this spring and consequently this spring would have to be made very heavy and much in excess of the load and the car would ride stiffly, not being affected by the usual motion.

In some instances the arms of the levers may be unequal so that the levers may be applied to cars where room is an object and in this case I prefer to make the springs unequal in order to obtain the best results. And in some instances, particularly when the car body is a short one, coiled springs may be used combined either with an elliptical spring or a coil spring.

I claim as my invention—

1. The combination of the car truck and car body or running bar, with equalizing levers and springs mounted between the car body and the truck at each end beyond the axles, substantially as described.

2. The combination of the truck, the frame, a running bar, springs extending from the truck frame to the bar, a lever on each end of the truck frame beyond the axles, and springs mounted between the lever and the running bar, substantially as described.

3. The combination of the truck frame, the running bar, springs extending from the truck frame to the bar, pivoted equalizing levers on each end of the truck frame, a spring on each end of each equalizing lever extending to the running bar, substantially as described.

4. The combination of the car body, the trucks, axles adapted thereto, with equalizing levers carried by the truck and mounted at each end thereof beyond the axles, with springs attached to the levers and car body, substantially as specified.

In testimony whereof I have signed my name to this specification in the presence of two subscribing witnesses.

WILLIAM H. HANSELL.

Witnesses:
 H. F. REARDON.
 WILLIAM A. BARR.